United States Patent
Laselva et al.

(10) Patent No.: US 12,028,806 B2
(45) Date of Patent: Jul. 2, 2024

(54) BEAM BASED MOBILITY STATE FOR UE POWER SAVING

(71) Applicant: NOKIA TECHNOLOGIES OY, Espoo (FI)

(72) Inventors: Daniela Laselva, Klarup (DK); Farahnaz Sabouri-Sichani, Aalborg (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 417 days.

(21) Appl. No.: 17/596,372

(22) PCT Filed: Jun. 12, 2019

(86) PCT No.: PCT/EP2019/065301
§ 371 (c)(1),
(2) Date: Dec. 8, 2021

(87) PCT Pub. No.: WO2020/249199
PCT Pub. Date: Dec. 17, 2020

(65) Prior Publication Data
US 2022/0232471 A1    Jul. 21, 2022

(51) Int. Cl.
*H04W 16/28* (2009.01)
*H04W 24/10* (2009.01)
*H04W 52/02* (2009.01)

(52) U.S. Cl.
CPC ....... *H04W 52/0216* (2013.01); *H04W 16/28* (2013.01); *H04W 24/10* (2013.01)

(58) Field of Classification Search
CPC ..... H04W 16/28; H04W 24/08; H04W 24/10; H04W 36/00; H04W 52/02; H04W 52/0216; H04W 88/02
(Continued)

(56) References Cited

U.S. PATENT DOCUMENTS

2017/0331670 A1* 11/2017 Parkvall ............ H04W 52/0251
2019/0342807 A1* 11/2019 Harada ............. H04W 36/0072
(Continued)

FOREIGN PATENT DOCUMENTS

WO     2018228588 A1    12/2018

OTHER PUBLICATIONS

International Search Report and Written Opinion for International Application No. PCT/EP2019/065301, mailed on Jan. 29, 2020, 14 pages.
(Continued)

*Primary Examiner* — Joseph Arevalo
(74) *Attorney, Agent, or Firm* — Robert P. Michal, Esq.; Carter, DeLuca & Farrell LLP

(57) ABSTRACT

The present invention introduces a beam-based UE mobility state estimate for power saving purposes, based on monitoring the distinct beam(s) (302) detected by the UE. In other words, the number N of distinct serving beams changed by the UE within a time window T is monitored (302) against the configured threshold values. If N is below a first threshold value "Thr1", a low/stationary mobility state is determined (303) and the UE applies a first measurement configuration (305) associated with the low/stationary mobility state. If N is between first and second threshold values "Thr1" and "Thr2", a medium mobility state is determined (304) and the UE applies a second measurement configuration (306) associated with the medium mobility state. If N is above the second threshold value "Thr2", a high mobility state is determined and the UE applies a third measurement configuration associated with the high mobility state.

12 Claims, 3 Drawing Sheets

(58) Field of Classification Search
USPC .................................. 370/318, 329, 252, 331
See application file for complete search history.

(56) References Cited

U.S. PATENT DOCUMENTS

| | | | | |
|---|---|---|---|---|
| 2021/0058131 A1* | 2/2021 | Zhu | ........................ | H04B 7/063 |
| 2021/0282143 A1* | 9/2021 | Lee | ..................... | H04W 52/343 |
| 2021/0314917 A1* | 10/2021 | Lee | ........................ | H04W 72/02 |
| 2021/0336688 A1* | 10/2021 | Lee | ........................ | H04W 4/40 |

OTHER PUBLICATIONS

3GPP TSG-RAN WG2 Meeting #105bis, R2-1903805; "Discussion on SA2 LS on Automatic Restoration of GFBR QOS"; Agenda Item: 11.14; Source: OPPO; Xi'an, China; Apr. 8-12, 2019; 2 pages.
3GPP TSG-RAN WG2 Meeting #106, R2-1906697; "Power Consumption Reduced in RRM Measurements"; Agenda item: 11.11.5; Source: Nokia, Nokia Shanghai Bell; Reno, Nevada, USA; May 13-17, 2019, 6 pages.
3GPP TSG TSG-RAN WG2 Meeting #106, R2-1908249; "Report of Email Discussion [105bis#29][NR/Power Saving] RRM Solutions", Agenda Item: 11.11.5; Source: MediaTek Inc.; Reno, Nevada, USA; May 13-17, 2019, 20 pages.
3GPP TSG-RAN WG2 Meeting #105, R2-1902147; "RRM Measurement Optimization for Power Saving"; Agenda item: 11.11.5; Source: LG Electronics Inc.; Athens, Greece; Feb. 25-Mar. 1, 2019, 2 pages.
Office Action for European Application No. 19732283.7, mailed on Aug. 30, 2023, 8 pages.
3GPP TSG RAN WG1 Meeting #96, R1-1903805; "Summary#5 of UE power Consumption Reduction in RRM Measurements"; Source: Vivo; Agenda Item: 7.2.9.3; Athens, Greece; Feb. 25-Mar. 1, 2019; 57 pages.

\* cited by examiner

BEAM BASED MOBILITY STATE FOR UE POWER SAVING

CROSS-REFERENCE TO RELATED APPLICATIONS

This application is a national stage entry of International Application No. PCT/EP2019/065301, filed Jun. 12, 2019, entitled "BEAM BASED MOBILITY STATE FOR UE POWER SAVING" which is hereby incorporated by reference in its entirety.

TECHNICAL FIELD

Various example embodiments relate to User Equipment (UE) power savings in 5G New Radio (NR) technology or any other currently existing or future mobile telecommunications systems.

BACKGROUND

Terminal devices of modern cellular communication systems have various features that affect power consumption. For example, smart phones execute various computer program applications and incorporate a power-hungry user interface such as a touch-sensitive display. In this context, particularly every terminal device comprises a radio modem that also incorporates various functions that consume power such as performing Radio Resource Management (RRM) measurements.

UE mobility state estimate (MSE) based on the number of cell changes within a network defined period, is used in LTE/NR (Long-Term Evolution/New Radio) for the scaling of the mobility parameters for UEs in Radio Resource Control (RRC) Idle/Inactive state (see 3GPP standard TS 38.304). Similar concepts have been applied to RRC Connected mode, where the handover events are counted rather than reselections and the scaling is applied to handover parameters such as Time To Trigger (TTT). Also, to this end, enhancements are proposed for HetNet (i.e. Heterogeneous networks) scenarios accounting for e.g. the cell size (see e.g. Shiwen Nie et al.: "An Enhanced Mobility State Estimation Based Handover Optimization Algorithm in LTE-A Self-organizing Network", The 6th International Conference on Ambient Systems, Networks and Technologies (ANT 2015), Procedia Computer Science 52 (2015), p. 270-277).

In the context of the release-16 study on UE power savings in New Radio (NR), 3GPP has been recently discussing about the relaxation (or adaptation) of the Radio Resource Management (RRM) measurements for power saving purposes. Such adaptation should be applicable to a UE in any RRC state, i.e. RRC_CONNECTED, RRC_INACTIVE and RRC_IDLE. Furthermore, the scope of such adaptation concerns primarily the RRM measurements of the neighbour cells both in intra-frequency and inter-frequency layers. In general, it is deemed beneficial to perform relaxation of these RRM measurements by allowing measurements with longer intervals, and/or by reducing the number of cells/carriers/SSB (i.e. Synchronization Signal Block) to be measured. Although, the relaxed monitoring criteria under which a UE may relax RRM measurements are currently not defined in the NR standard, they may be based for instance on the following aspects: the link quality of the serving cell (as compared to a minimum quality threshold); the UE mobility status (e.g. accounting for UE speed, movement, direction, cell re-selection, UE type, etc.); and the serving cell beam status (e.g. accounting for beam specific link condition).

It is known from R2-1904155 that the network may provide assistance signalling for RRM relaxation in the form e.g. of a neighbour beam information. Similarly, R2-1900602 mentions that SSB/CSI-RS (i.e. Synchronization Signal Block/Channel-State Information Reference Signal) index can be used to identify different beams, so it provides location or directional information.

Relaxation of the neighbour cells measurements based on serving cell level is a known concept, e.g. based on S-measure in LTE/NR (3GPP TS 38.304).

Relaxed monitoring is also applied to neighbour cells in NB-IoT in RRC Idle state, if the quality of the camping cell does not drop below the value indicated by the SsearchDeltaP parameter during the period given by TsearchDelta parameter, with a re-evaluation of the quality at least every 24 h but not within first 5 min after a re-selection is performed (3GPP TS 38.304).

Beam management procedures are introduced in 5G NR, allowing to beam-form (direct) data transmissions and signaling transmissions with the aim to increase the link budget and overcome the disadvantages of path loss. Beamforming results in a beam-based cell coverage of a 5G cell, where a mobile terminal device in the cell is connected to and operates within a single beam, whereas multi-beams connection is not supported in 3GPP Release 15. The beam management procedures comprising beam sweeping, beam measurements, beam determination, beam reporting and beam failure recovery are described in 3GPP standards e.g. TS 38.331, TS 38.300, TS 38.304, TS 38.211 and TS 38.213.

The problem of the presented solutions is that the existing mechanisms to relax RRM measurement (i.e. monitoring) are based on UE's mobility status, relying on e.g. serving cell variation, UE's speed/movement, cell reselection or handover, etc., or serving cell beam status but there is room for more efficient mechanism in relaxing RRM measurements.

SUMMARY

The scope of protection sought for various example embodiments of the invention is set out by the independent claims.

The embodiments, examples, and features described in this specification that do not fall under the scope of the independent claims are to be interpreted as examples useful for understanding various embodiments of the invention.

The presented example embodiments describe a new Beam-Based UE Mobility State (i.e. BBMS) for a User Equipment which has beam management configured. The beam-based UE mobility state BBMS is used to perform adaptation of the Radio Resource Management (RRM) measurements, with specific relaxed measurement and reporting configurations being provided by the network and mapped to different levels of BBMS (such as stationary/low, medium, and high, for instance). The mobility levels are defined by network configured threshold values.

The RRM measurements comprise RSRP and RSRQ (Reference Signal Received Power/Reference Signal Received Quality) measurements. Relaxation of measurements can be picked from any combination of RSRP and/or RSRQ measurements. Furthermore, the relaxation may also comprise some or many non-RRM measurements. However, this is not mandatory.

In other words, the novelty of the presented example embodiments lies in a newly defined beam-based UE mobility state estimate (i.e. BBMS estimate), whose definition is based on monitoring the beam(s) detected by the UE (and measured utilizing the existing beam management mechanisms) over a certain time period according to the following conditions.

In an example embodiment, the number N of distinct serving beams changed by the User Equipment (UE) within a time window T is monitored against the following threshold values:

a) If N is below a threshold value "Thr1"=>low/stationary mobility state is estimated=>the UE applies measurement configuration no. 1 (i.e. a first measurement configuration) associated with the low/stationary mobility state.

b) If N is between threshold values "Thr1" and "Thr2"=>medium mobility state is estimated=>the UE applies measurement configuration no. 2 (i.e. a second measurement configuration) associated with the medium mobility state.

c) If N is above a threshold value "Thr2"=>high mobility state is estimated=>the UE applies measurement configuration no. 3 (i.e. a third measurement configuration) associated with the high mobility state.

The measurement configurations can be separately defined by the 5G NR gNB.

The example embodiments comprise a UE apparatus, an apparatus of a telecommunication network (i.e. in the network side), respective methods for both of the apparatuses, and respective computer programs and respective mediums where the computer programs can be stored. Thus, the inventive aspects comprise apparatuses, methods, computer programs implemented in a form of program code, and respective storing media for the computer program(s).

BRIEF DESCRIPTION OF THE DRAWINGS

Some example embodiments will now be described with reference to the accompanying drawings.

DETAILED DESCRIPTION

Figure 1:
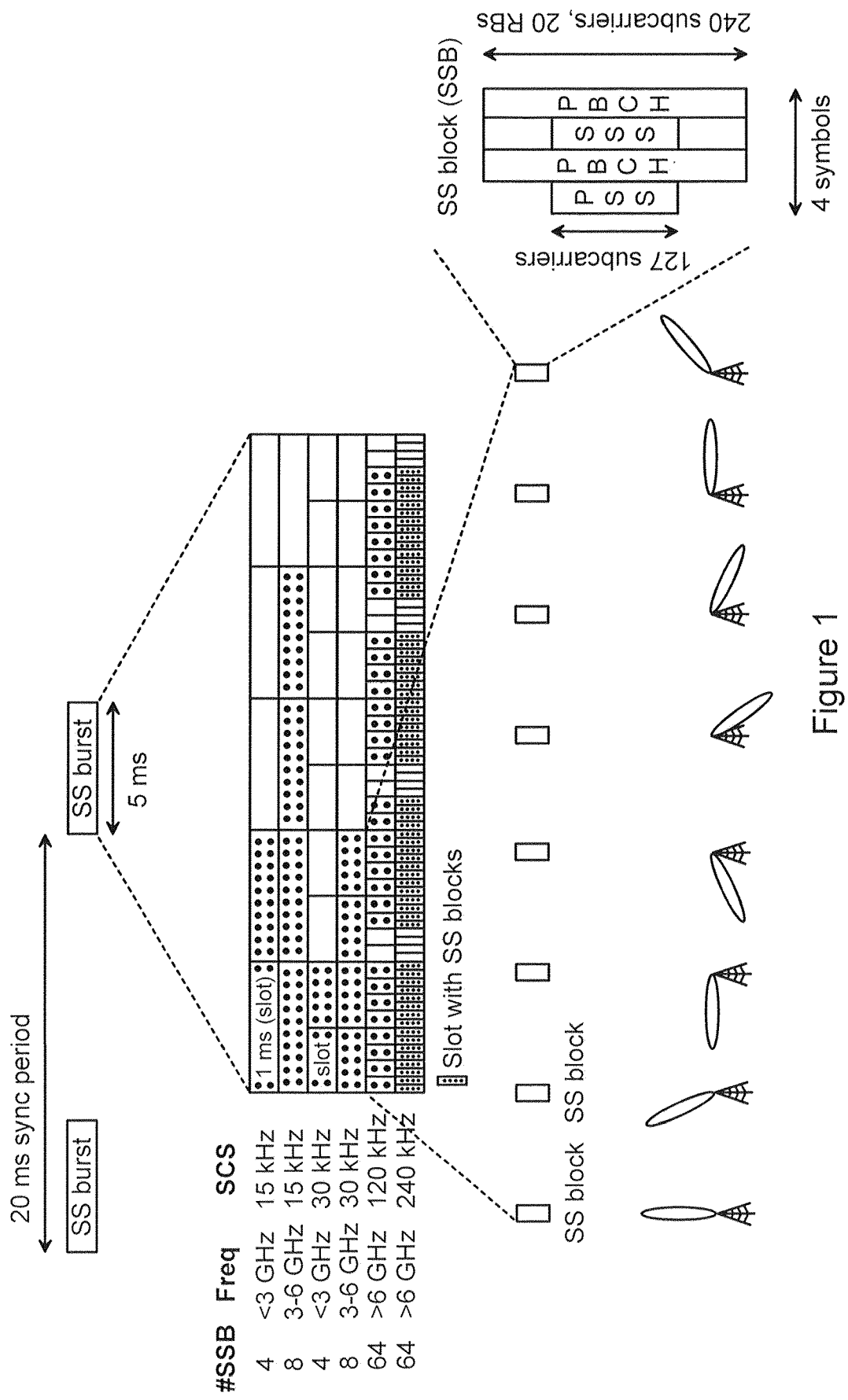
FIG. 1 shows an exemplary illustration of multi-beam SSB, with an SSB burst, in an example embodiment.

The disclosure is in the context of User Equipment (UE) power savings in 5G NR (New Radio), which is a recently finalized Release-16 study item (see RP-181463 "Study on UE Power Saving in NR" from corresponding 3GPP TSG RAN Meetings #80 in La Jolla, USA on 11-14 Jun. 2018, and corresponding 3GPP TR 38.340), whose follow-up Release-16 work item is given in the 3GPP RP-190727.

However, the present disclosure is not restricted into merely 5G New Radio concepts, but many other currently existing and future telecommunications technologies and systems may be applied if the conditions are otherwise satisfied.

One of the means to achieve UE power saving is through the relaxation of the Radio Resource Management (RRM) measurements, whenever a UE fulfils the conditions of low mobility and radio channel stationarity, as suggested in 3GPP TR 38.840.

The scope of applicability of the potential relaxation covers both Radio Resource Control (RRC) Connected and Idle/Inactive states, and the relevant adaptation comprises at least one of the following reductions or schemes:

Reducing the number of Reference Signal Received Power/Quality (RSRP/RSRQ) measurements on the serving cell
  by increasing the measurement period, reducing the number of samples (e.g., OFDM symbols/slots) within a measurement period (e.g., SMTC (i.e. Synchronization signal block Measurement Timing Configuration) window), confining RRM measurements within a measurement window and/or reducing the number of beams to measure.

Reducing the number of RSRP measurements on the neighbor cells
  for instance, reducing the number of cells for intra-frequency measurements, and similarly for inter-frequency measurements, and/or performing the measurement of a neighbour cell by relaxing it as described above.

Power Saving Schemes for RRM measurements using Additional Resources: Providing new reference signal or align timing of existing ones (e.g. Synchronization Signal Block, SSB) w/Discontinuous Reception, DRx.

Reducing the number of measurement reports.

Generally speaking, the relevant use cases concerning the relaxation of measurements may comprise one or many of the following:

1. Relaxed serving cell measurements in RRC Idle/Inactive state
2. Relaxed intra-frequency neighbour cell measurements in RRC Idle/Inactive state
3. Relaxed inter-frequency neighbour cell measurements in RRC Idle/Inactive state
4. Relaxed serving cell measurements in RRC Connected state
5. Relaxed intra-frequency neighbour cell measurements in RRC Connected state
6. Relaxed inter-frequency neighbour cell measurements in RRC Connected state
7. L3 beam measurements in RRC Connected state The following solutions may also be used:
Conditions for RRM measurement relaxation (e.g. UE mobility state, and UE "location")
Network assistance signalling for RRM relaxation (e.g. neighbour beam information)
UE assistance signalling to trigger RRM relaxation (e.g. UE mobility state)

In a possible solution of an example embodiment, the UE measuring an RSRP/RSRQ level (or increase) on the serving cell being above a network-configured threshold (i.e. the S-measure) can be anticipated as a beneficial entry condition. After relaxing the RRM measurements, the UE will still from time to time, though with reduced periodicity (or in other above mentioned relaxed ways), monitor the RSRP level and it will exit the relaxed mode if the RSRP level (or decrease) is falling below a threshold.

In an example embodiment, the following issues and possibilities are discussed, which arise, when applying adaptation of Radio Resource Management measurements in conjunction with beam forming (thus, multi-beam measurements part of the beam management procedures). In the following, the concept of beam measurements is introduced as useful background. In more detail, a single-beam measurement versus multi-beam measurements are discussed next.

When considering frequencies for which beam operations are needed, the SS (Synchronization Signal)/PBCH (Physical Broadcast Channel) block (i.e. SSB) burst is transmitted consisting of multiple SSBs, which are associated with different SSB indices and potentially with different transmission beams, see FIG. 1. SS bursts may have a 20 ms sync period. A single SS burst may have a length of 5 ms. A single slot may have a length of 1 ms, or ½, ¼ or ⅛ of a ms (in this example), depending on the NR numerology and specifically on the subcarrier spacing (SCS). Each SS block comprises four symbols: Primary Synchronisation Signal (PSS), Physical Broadcast Channel (PBCH), Secondary Synchronisation Signal (SSS) and another Physical Broadcast Channel (PBCH). The PSS comprises 127 subcarriers, while the PBCH comprise 240 subcarriers in 20 Resource Blocks (i.e. 12 subcarriers per an RB). In other words, each SS block (SSB) can be mapped to a certain angular direction (i.e. beam); see the lower part of FIG. 1 showing eight different beam directions as an example. Therefore, for RRM measurements in Release-15, a downlink measurement is supported with both single-beam and multi-beam based operations (where the beam number=SSB number).

A UE in RRC IDLE/INACTIVE state measures different beams according to the SS block burst to derive cell quality level across the corresponding beams. This is specified also in standard TS 38.304.

Figure 2:
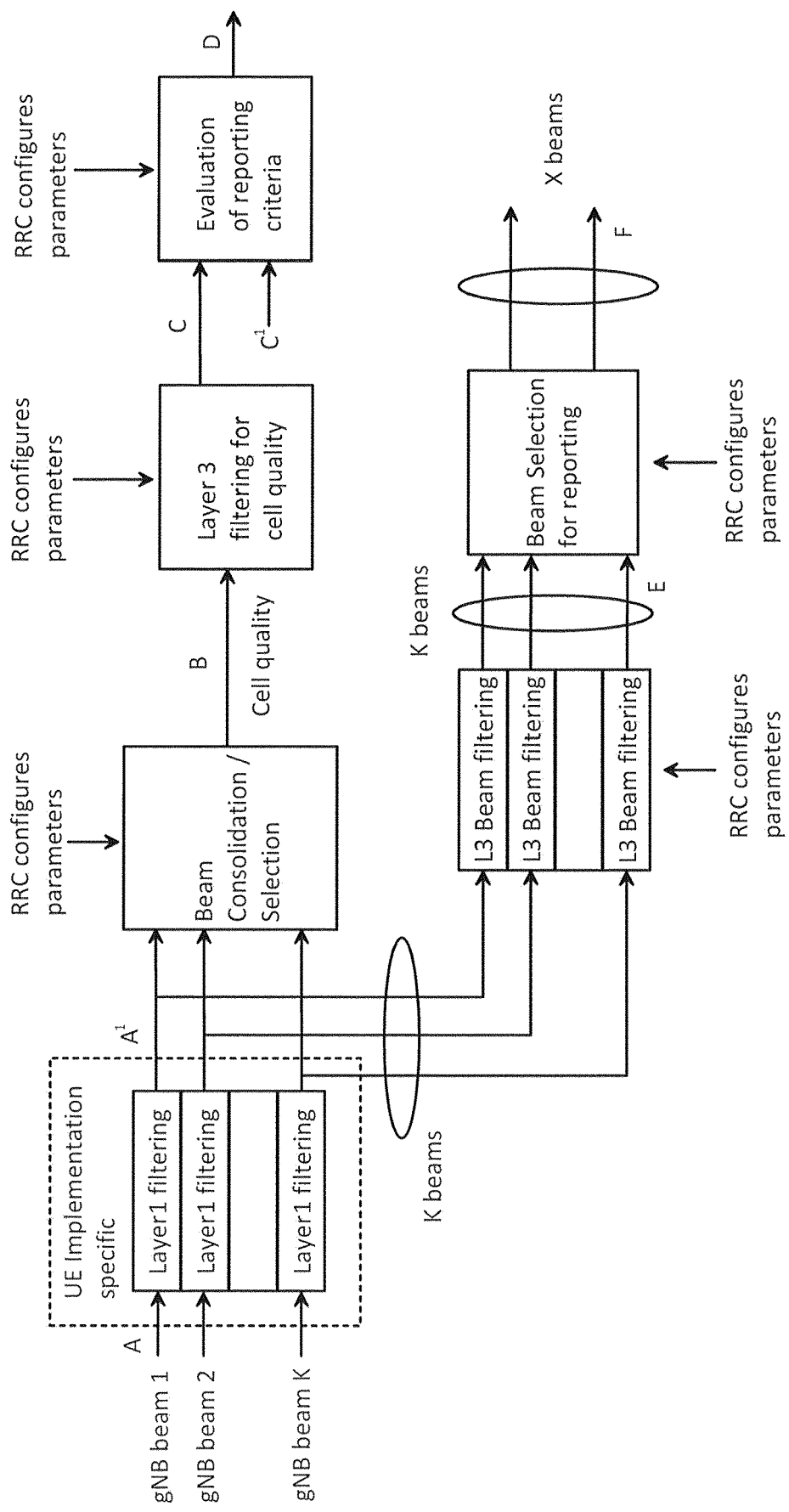
FIG. 2 shows an illustration of a beam measurement model in New Radio according to 3GPP standard TS 38.300.

A UE in RRC CONNECTED state can be configured to measure UE-specific reference signals referred to as Channel-State Information Reference Signal (CSI-RS) for L3 mobility (i.e. layer 3), in addition to the SS block. Besides, the SSB-based measurement timing configuration (SMTC) comprising a certain duration and periodicity can be used to restrict the UE measurement on certain resources to reduce the UE power consumption. Within the SMTC period and on the configured SSB(s) and/or CSI-RS, the UE will conduct the Radio Link Monitoring (RLM)/Radio Resource Management (RRM) measurements. Up to two measurement window periodicities (for SMTC) can be configured for intra-frequency measurements in RRC CONNECTED mode, providing the flexibility to a UE to measure different cells. This is because the best directions for the transmitted beams need to be periodically identified (e.g. by beam searching or sweeping operations), in order to maintain the alignment between the communicating node. For this purpose, SSB- and CSI-based (Channel State Information) measurement results can be jointly used to reflect the different coverage which can be achieved through different beamforming techniques. In RRC CONNECTED, the UE measures one or multiple beams of a cell and the measurement results (i.e. power values) are averaged to derive the cell quality. In doing so, the UE is configured to consider a subset of the detected beams. The beams (SSBs) to measure may be defined using the bitmap of "SSB-ToMeasure", defined in standard TS 38.331. Filtering takes place at two different levels: at the physical layer to derive beam quality and then at the RRC level to derive cell quality from multiple beams (as illustrated in FIG. 2, which is discussed in the next paragraph). Cell quality from the beam measurements is derived in the same way for the serving cell(s) and for the non-serving cell(s). Measurement reports may contain the measurement results of the best beams if the UE is configured to do so by the Next Generation NodeB (gNB) (as in 3GPP standard TS 38.300).

FIG. 2 illustrates beam measurement models in New Radio according to 3GPP standard TS 38.300. Next Generation NodeB beams ("gNB beam 1", "gNB beam 2", . . . , "gNB beam K") are shown as incoming signals (A) to "UE Implementation specific" "Layer 1 filtering" blocks. "Beam Consolidation/Selection" is done first for the $A^1$ outputs where the RRC also configures its parameters, among all the following blocks as well. The output is the cell quality (i.e. B), which is fed to "Layer 3 filtering for cell quality". Its output C is fed (together with $C^1$ input) to "Evaluation of reporting criteria", whose output is marked as D. The K beams of $A^1$ are also fed to "L3 Beam filtering" blocks whose outputs are K beams as marked with E. Next the "Beam Selection for reporting" is performed and its output consists of X beams marked as output F.

In summary, different measurements can be run regarding beam management:
  RRC IDLE/INACTIVE mode: based on PSS (Primary Synchronization Signal), SSS (Secondary Synchronization Signal) and PBCH DMRS (Physical Broadcast Channel Demodulation Reference Signal) (i.e. SSB)
  RRC CONNECTED mode: based on CSI-RS (in downlink) and SRS (i.e. Sounding Reference Signal) (in uplink) and/or SSB
  The RRM configuration can comprise both beam measurement information (for layer 3 mobility) associated to SS Block(s) and CSI-RS(s) for the reported cell(s) if both types of measurements are available (according to standard TS 38.300).
  From layer 1 (L1) perspective: UE measures at least 14 SSBs with different SSB indices and/or PCI (i.e. Physical Cell Identity) allocation per the intra-frequency layer per measurement period.
  From L3 perspective: UE computes at least one L3 measurement sample per SSB index per 200 ms.
  From performance perspective: the given accuracy range is always met in RRC CONNECTED state.

We next discuss a problem, which is related to the issues presented below.

A few references such as R2-1900602 (mentioned above) and the email discussion R2-1904155 (also mentioned above) disclose that the SSB/CSI-RS index can be used to identify different beams, so it provides some information about the location and direction of the UE and may assist in the relaxation of RRM measurements. Also, the email discussion R2-1904155 discloses that "neighbor beam info" among the potential network assistance could be used for RRM relaxation. This seems to cover a sort of a beam neighbor list to indicate to a UE what are its neighbor cells relevant for the measurements, as a function of its current serving beam.

In an example embodiment, there is provided a method to utilize beam measurements to guide measurement relaxation. In brief, this example embodiment applies deriving a new UE mobility state parameter based on beam level information.

In other words, the presented example embodiment presents a new Beam-Based UE Mobility State (i.e. BBMS) parameter for a UE, which has beam management configured. The BBMS is used to perform adaptation of the Radio Resource Management (RRM) measurements, with specific relaxed measurement and reporting configurations being provided by the network and mapped to different levels of BBMS (such as stationary/low, medium, and high, for instance). The mobility levels are defined by network configured threshold values.

More precisely, the presented example embodiment defines a beam-based UE mobility state estimate (i.e. BBMS estimate), whose definition is based on monitoring the beam(s) detected by the UE and measured utilizing the existing beam management mechanisms over a certain time period according to the following conditions a)-c). Furthermore, in an example embodiment, the beam-based UE mobility state (BBMS and/or BBMS estimate) is combined with a relaxed RRM measurement scheme, where the relaxed RRM measurement scheme is further associated with a reporting configuration respective to each UE mobility state value.

In an example embodiment, the condition is determined in a way that a number N of distinct serving beams changed by the User Equipment (UE) within a time window T is monitored against the following predefined threshold values:

a) If N is below a first threshold value "Thr1"=>low or stationary beam-based UE mobility state is detected=>UE then applies measurement configuration no. 1.
b) If N is between first and second threshold values "Thr1" and "Thr2"=>medium beam-based UE mobility state is detected=>UE then applies measurement configuration no. 2.
c) If N is above the second threshold value "Thr2"=>high beam-based UE mobility state is detected=>UE then applies measurement configuration no. 3. Alternatively, the measurement configuration no. 3 is the unrelaxed measurement scheme applied normally with the UE.

In this example, option c) represents a usual RRM measurement configuration, meaning that no specific relaxation is performed in the RRM measurement configuration (i.e. to configuration no. 3). Still, the second threshold value of Thr2 can be predefined in order to determine the proper limit value for regular operation in RRM measurements.

Options a) and b) on the other hand represent relaxed schemes for RRM measurements, with predefined first and second threshold values Thr1 and Thr2. Also actual relaxed measurement configuration no:s 1 and 2 can be predetermined e.g. by the administrator of the network. The next description in view of FIG. 3 discloses the relaxation options of a) and b) in more detail in respective example embodiments.

Figure 3:
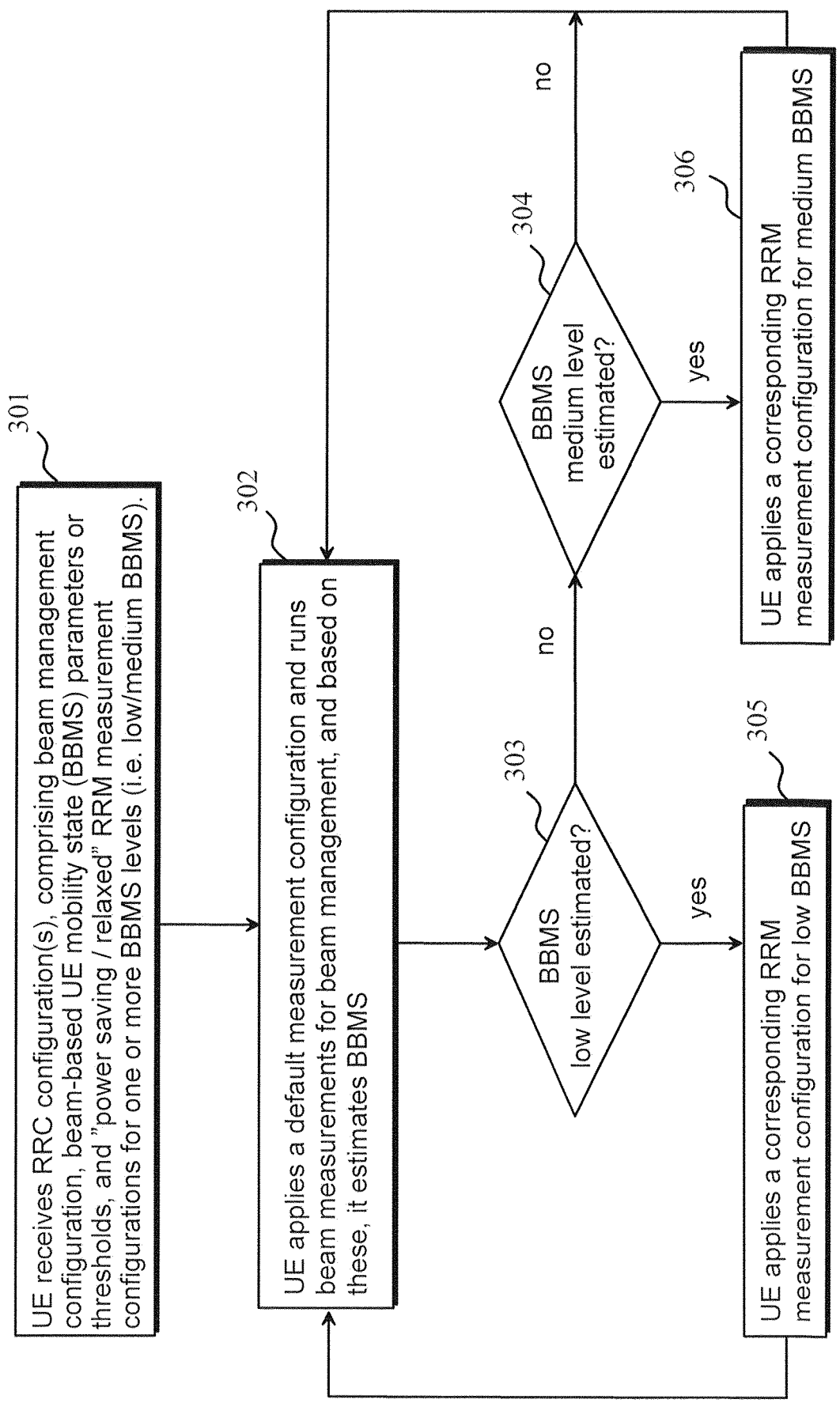
FIG. 3 shows an example embodiment in a flow chart utilizing beam-based UE mobility state (i.e. BBMS) for relaxing measurement configuration of the UE.

FIG. 3 illustrates a flow chart of an example embodiment, which utilizes a so-called beam-based UE mobility state (i.e. BBMS). For instance, two measurement configurations are assumed to have been provided by the network for low/stationary and medium beam-based UE mobility state (BBMS), respectively. If the beam-based UE mobility state, BBMS, is estimated to be low or stationary, the most relaxed configuration can be applied, which e.g. may remove completely the measurements of the neighbour cells of intra/inter-frequency layers, and additionally it may increase the periodicity of the serving cell measurements. This is an example of a fully reduced scheme of RRM measurements for the UE. Likewise, when the BBMS is estimated to be medium, the corresponding measurement configuration can be set to relax only intra/inter-frequency neighbours. This is an example of a partially reduced scheme of RRM measurements for the UE. When the BBMS is estimated to not fulfil either of these, it is decided that the UE mobility state is high. This means that an associated RRM measurement configuration applies a regular scheme of measurements for the UE. Alternatively, the high UE mobility state may result in a slightly fine-tuned set of measurements for the UE compared to the regular scheme of measurements. In other words, there can be just a few measurements missing from the regular scheme; while still fulfilling the requirements of the standard.

At first at step 301, the User Equipment receives Radio Resource Control configuration(s), comprising beam management configuration, beam-based UE mobility state (BBMS) parameters or thresholds, and "power saving/relaxed" Radio Resource Management measurement configurations for one or more BBMS levels (i.e. low/medium BBMS). In other words, the BBMS parameters or thresholds are the same as Thr1 and Thr2 defined earlier. Similarly, the RRM measurement configurations are the same as "measurement configuration no:s 1, 2 and 3".

Secondly at step 302, the UE applies a default measurement configuration and runs beam measurements for beam management, and based on these, it estimates BBMS. In other words, this means that the number N of distinct serving beams changed by the UE within a predetermined time window T is monitored in view of the threshold values received in step 301.

In step 303, the algorithm checks whether the BBMS estimate shows a low mobility state level, comprising also the stationary BBMS estimate. This is the same as checking if the number N from above is below the predetermined first threshold value Thr1. If that indeed is the case, the algorithm moves to step 305. In there, the UE applies a corresponding RRM measurement configuration for low BBMS estimate, i.e. the predetermined measurement configuration no. 1 is applied by the UE. The process can be set as a continuous process, thus meaning that the algorithm goes then back to step 302, i.e. running again the beam measurements and estimating the BBMS once again. The algorithm continues from there in a continuous manner.

If the BBMS estimate does not indicate a stationary or low level for the UE mobility state, the algorithm checks next in step 304 whether the number N is between the predefined first and second threshold values Thr1 and Thr2. If this is the case, the algorithm goes to step 306, where the UE applies a corresponding RRM measurement configuration for medium BBMS estimate, i.e. the predetermined measurement configuration no. 2 is applied by the UE. As from step 305, the process can be set from step 306 as well as a continuous process, thus meaning that the algorithm goes then back to step 302, i.e. running again the beam measurements and estimating the BBMS once again. The algorithm continues from there in a continuous manner.

As already indicated above, the measurement configuration no. 2 has some level of relaxation for the measurement scheme, while the measurement configuration no. 1 has even more relaxation for the measurement scheme than measurement configuration no. 2.

If the step 304 concludes that the BBMS estimate does not indicate stationary or low or medium UE mobility state, the algorithm concludes that the UE BBMS is high. This means in an example embodiment that no changes are made to regular measurement scheme for the UE and the algorithm goes back to step 302. This means that the number N is above the second threshold value Thr2, which indicates a high UE beam-based mobility state, which further implies that the UE applies measurement configuration no. 3. In an example embodiment, the measurement configuration no. 3 is the unrelaxed, regular measurement scheme used normally by the UE. In yet another example embodiment, the measurement configuration no. 3 can be a fine-tuned measurement scheme, which stays between the regular scheme (as referred above) and the measurement configuration no. 2 regarding the "relaxation" aspects. In other words, the measurement configuration no. 3 for the high UE mobility state can be also set as a new measurement scheme which is received in the UE in step 301. Of course, the measurement scheme no. 3 needs to be a feasible one, which does not deteriorate the performance or jeopardize the operation according to the relevant standards (such as TS 38.331).

The measurement configurations can be separately defined, e.g. as initial parameters from the network administrator or the like, or by the network itself (control logic).

Thus, the network needs to carefully configure proper values for the parameters T (the time window) and Thr1, Thr2 (the first and second threshold values) to allow the UE to estimate its mobility state (or similarly, the changes in radio channel conditions). It is noted that, differently from the legacy UE mobility state (as described earlier), according to the proposed condition the UE may be crossing back and forth the same neighbour beams multiple times without triggering the condition a) for the low/stationary UE mobility state. That is, in case the UE's mobility or the radio channel condition changes are still such that the UE remains within a given geographical area of interest, a certain measurement configuration applying relaxation is still a valid way to proceed, in an example embodiment.

In an example embodiment, there can be defined more than two different relaxation levels for the RRM measurements. In such a situation, the network may provide more than two different threshold values. In practice, there can be any number of threshold values predefined for determining a number of different relaxation schemes for the RRM measurement configurations.

Thus, in an example embodiment, there can be predefined a first, second and third threshold value, where if the N is below a first threshold value "Thr1", a relaxation according to the measurement configuration no. 1 is applied by the UE. If N is between the first and second threshold values, a relaxation according to the measurement configuration no. 2 is applied by the UE. If N is between the second and third threshold values, a relaxation according to the measurement configuration no. 3 is applied by the UE. And if N is above the third threshold value, it can be defined that no relaxation will take place in the UE measurements.

In the same manner, even more relaxation schemes for the measurements and respective threshold values Thr1-ThrN can be predetermined in corresponding example embodiments.

It is remarked that the newly introduced beam-based UE mobility state parameter, i.e. the BBMS, is not replacing the legacy UE mobility state but it rather complements the legacy UE mobility state parameter for the purpose of UE power saving schemes.

For more detailed disclosure of the presented example embodiments concerning the algorithm, we state the following details.

For a UE in RRC Idle state, Rel-15 TS 38.304 defines UE mobility states based on the number of reselections. If medium or high mobility state is estimated to be present, the UE should scale some Idle mode mobility parameters such as $Q_{hyst\ and}\ T_{reselection,NR}$. Whereas if a low mobility state is estimated, no such scaling is applied.

Standard TS 38.304, Section 5.2.4.3 mentions that: "Normal-mobility state criteria: If total number of cell reselections during time period T,$CR_{max}$ is less than NCR_M."

For a UE in RRC Connected state, no 3GPP definition of UE mobility state is given, however a mobility state definition based on the number of handovers has been considered.

As compared to the so-called legacy UE mobility states, the example embodiments have identified three differences in the newly proposed mobility state as follows:
 a) The disclosure introduces a beam-based mobility state rather than a cell-based state.
 b) The example embodiments consider changes of distinct beams rather than the total number of changes.
 c) The proposed mobility state, BBMS, is used for a different purpose than earlier: For switching between RRM measurement configurations for power saving rather than for scaling mobility parameters. In fact, in the situations described earlier in the legacy, in case of a low mobility state, no action is taken by the UE, whereas in our example embodiments this (i.e. low) is the most relevant mobility state to relax the RRM measurements.

The example embodiments impact both the UE and the network side. It introduces new UE operations and behavior for power savings i.e. the UE estimates a new beam-level UE mobility state and based on that it applies RRM measurement configuration relaxation scheme according to a network-initiated instruction. Similarly, the example embodiments require instruction(s) and configuration by the network.

In an example embodiment, the received RRM measurement configuration associated to a low UE mobility state comprises a relaxed measurement scope. The relaxed measurement scope relates to e.g. serving cell measurements vs. intra-frequency measurements vs. inter-frequency measurements vs. inter-RAT (i.e. Radio Access Technology) measurements, and/or to a relaxed (i.e. reduced) number of cells to measure within each layer (intra-frequency vs. inter-frequency vs. inter-RAT measurements). The relaxed measurement may be associated with a Connected state or with a Idle/Inactive state, as listed earlier in relevant use cases no:s 1-7. The medium UE mobility state may apply a partially relaxed measurement scope, where the relaxed measurements (i.e. non-performed) may be picked from the same relevant use case list items no:s 1-7. There are thus many possibilities to obtain a partially relaxed measurement scope; it may comprise one or several of the following: removal of the measurements of the neighbour cells of inter-frequency layers, removal of the measurements of the inter-RAT cells, removal of the intra-frequency neighboring cell measurements, and/or increasing the periodicity of the intra-frequency neighboring cell measurements. These are merely examples, so also other RRM measurements and/or non-RRM measurements can be included in the group of measurements which are not performed in case the respective measurement configuration is applied.

In an example embodiment, the relaxed measurement scope relates to any relaxation in terms of complete skipping or reduced measurements in terms of measurement periodicity, number of measured samples, number of measured intra- and/or inter-frequency neighbor cells, number of measured inter-RAT (Radio Access Technology) cells, and/or number of measured beams.

In an example embodiment of a fully reduced scheme of measurements for the UE, a fully reduced/relaxed RRM measurement scheme could for example be the largest possible relaxation including all neighbor cells but the serving cell, or potentially also including the serving cell measurements.

In an example embodiment of a partially reduced scheme of RRM measurements for the UE, a partially reduced/relaxed RRM measurement scheme could for example relax measurements on inter-frequency neighbor cells and inter-RAT measurements and potentially intra-frequency neighbor cells.

In an example embodiment, there can be more than two reduced schemes of RRM measurements for the UE, where the high mobility state estimate results in a regular scheme of RRM measurements for the UE, and the lesser the mobility state estimate, the more reduced scheme of RRM measurements for the UE can be applied among the more than two reduced schemes of RRM measurements for the UE.

The low UE mobility state is meant to comprise also the completely or substantially stationary mobility state for the UE.

In a example embodiment, there is a User Equipment (UE) apparatus, in connection to a telecommunication network, the UE apparatus comprising
  at least one processor,
  at least one memory comprising computer program code,
  the at least one memory and the computer program code configured to, with the at least one processor, cause the UE apparatus at least to perform the steps of:
    receiving a network configuration 301 comprising beam-level measurement parameters and at least one threshold for power savings and associated Radio Resource Management (RRM) measurement and/or reporting configuration,
    estimating a mobility state 303, 304 based on at least a beam-level measurement in view of the received at least one threshold and/or the beam-level measurement parameters, and
    applying the associated RRM measurement configuration 305, 306 based on the estimated mobility state.

In another aspect according to an example embodiment, the UE apparatus is provided with:
  receiving means (i.e. a receiver) for receiving a network configuration 301 comprising beam-level measurement parameters and at least one threshold for power savings and associated Radio Resource Management (RRM) measurement and/or reporting configuration,
  controlling means for estimating a mobility state 303, 304 based on at least a beam-level measurement in view of the received at least one threshold and/or the beam-level measurement parameters, and
  the controlling means for applying the associated RRM measurement configuration 305, 306 based on the estimated mobility state.

In an example embodiment of the UE apparatus, it is further caused to perform the step of:
  monitoring a number N of distinct serving beams changes 302 within a predetermined time window T against the received at least one threshold based on the received network configuration, as the beam-level measurement, where N and T are beam-level measurement parameters.

In an example embodiment of the UE apparatus, the received RRM measurement configuration associated to a low mobility state 303 comprises a relaxed measurement scope.

In an example embodiment of the UE apparatus, the relaxed measurement scope relates to any relaxation in terms of complete skipping or reduced measurements in terms of measurement periodicity, number of measured samples, number of measured intra- and/or inter-frequency neighbor cells and/or inter-RAT (Radio Access Technology) cells, and/or number of measured beams.

In an example embodiment of the UE apparatus, the received at least one threshold comprises a first threshold Thr1, where a low mobility state 303 is defined when N is below the first threshold Thr1.

In an example embodiment of the UE apparatus, the received at least one threshold comprises a first threshold Thr1 and a second threshold Thr2, where a medium mobility state 304 is defined when N is between the first and second thresholds Thr1 and Thr2.

In an example embodiment of the UE apparatus, the received at least one threshold comprises a second threshold Thr2, where a high mobility state is defined when N is above the second threshold Thr2.

In an example embodiment of the UE apparatus, the received at least one threshold comprises three or more thresholds, where there are respectively at least four associated Radio Resource Management (RRM) measurement configurations determined by the thresholds, corresponding to respective at least four mobility state estimates.

In an example embodiment of the UE apparatus, an associated RRM measurement configuration 305 for the estimated low mobility state 303 comprises a fully reduced scheme of RRM measurements for the UE.

In an example embodiment of the UE apparatus, an associated RRM measurement configuration 306 for the estimated medium mobility state 304 comprises a partially reduced scheme of RRM measurements for the UE.

In an example embodiment of the UE apparatus, an associated RRM measurement configuration for the estimated high mobility state comprises a regular scheme of RRM measurements for the UE.

In an example embodiment of the UE apparatus, after estimation of a medium mobility state 304, the associated RRM measurement configuration 306 removes completely the measurements of the neighbour cells of inter-frequency layers as well as inter-RAT cells, and increases the periodicity of the intra-frequency neighboring cell measurements.

In an example embodiment of the UE apparatus, after estimation of a low mobility state 303, the associated RRM measurement configuration 305 removes completely the measurements of the neighbour cells of intra- and inter-frequency layers, and increases the periodicity of the serving cell measurements.

In an example embodiment of the UE apparatus, in case the UE crosses back and forth the same neighbour beams multiple times so that the UE remains within a given geographical area of interest, a low mobility state 303 is configured to be estimated.

In an example embodiment, there is an apparatus, being part of a telecommunication network, comprising
  at least one processor,
  at least one memory comprising computer program code,
  the at least one memory and the computer program code configured to, with the at least one processor, cause the apparatus at least to perform the step of:
    sending to a User Equipment (UE) beam-level measurement parameters and at least one threshold for power savings and associated Radio Resource Management (RRM) measurement and/or reporting configuration.

In another aspect according to an example embodiment, the apparatus of the telecommunication network is provided with:
  transmission means for sending to a User Equipment (UE) beam-level measurement parameters and at least one threshold for power savings and associated Radio Resource Management (RRM) measurement and/or reporting configuration.

In an example embodiment, the apparatus which is part of the network (i.e. the network side, as opposed to the UE apparatus), is configured to determine cell-specific beam-level parameters and the at least one threshold for power savings based on beam and neighbor cells deployment.

In an example embodiment, the apparatus which is part of the network (i.e. the network side, as opposed to the UE apparatus), is configured to determine UE-specific beam-level measurement parameters and the at least one threshold for power savings based on a current serving beam of the UE as reported by the UE.

In an example embodiment, the apparatus which is part of the network (i.e. the network side, as opposed to the UE apparatus), is configured to determine an associated RRM measurement configuration for each mobility state level.

In an aspect, the presented concept comprises also a method applicable in a User Equipment (UE) apparatus, in connection to a telecommunication network, the method comprising the steps of:
receiving a network configuration 301 comprising beam-level measurement parameters and at least one threshold for power savings and associated Radio Resource Management (RRM) measurement and/or reporting configuration,
estimating a mobility state 303, 304 based on at least a beam-level measurement in view of the received at least one threshold and/or the beam-level measurement parameters, and
applying the associated RRM measurement configuration 305, 306 based on the estimated mobility state.

The corresponding method in its various example embodiments may apply similar steps which are already disclosed above in relation to the corresponding apparatus, in its various example embodiments (the UE).

In an aspect, the presented concept comprises also a method, applicable in an apparatus being part of a telecommunication network, the method comprising the step of:
sending to a User Equipment (UE) beam-level measurement parameters and at least one threshold for power savings and associated Radio Resource Management (RRM) measurement and/or reporting configuration.

The corresponding method in its various example embodiments may apply similar steps which are already disclosed above in relation to the corresponding apparatus, in its various example embodiments (the apparatus which is part of the network).

In an aspect, the presented concept comprises also a computer program comprising instructions for causing a User Equipment (UE) apparatus to perform at least the following steps:
receiving a network configuration 301 comprising beam-level measurement parameters and at least one threshold for power savings and associated Radio Resource Management (RRM) measurement and/or reporting configuration,
estimating a mobility state 303, 304 based on at least a beam-level measurement in view of the received at least one threshold and/or the beam-level measurement parameters, and
applying the associated RRM measurement configuration 305, 306 based on the estimated mobility state.

In an aspect, the presented concept comprises also a computer program comprising instructions for causing an apparatus of a telecommunication network to perform at least the following step:
sending to a User Equipment (UE) beam-level measurement parameters and at least one threshold for power savings and associated Radio Resource Management (RRM) measurement and/or reporting configuration.

In an aspect, the presented concept comprises also a non-transitory computer readable medium comprising program instructions for causing a User Equipment (UE) apparatus to perform at least the following steps:
receiving a network configuration 301 comprising beam-level measurement parameters and at least one threshold for power savings and associated Radio Resource Management (RRM) measurement and/or reporting configuration,
estimating a mobility state 303, 304 based on at least a beam-level measurement in view of the received at least one threshold and/or the beam-level measurement parameters, and
applying the associated RRM measurement configuration 305, 306 based on the estimated mobility state.

In an aspect, the presented concept comprises also a non-transitory computer readable medium comprising program instructions for causing an apparatus of a telecommunication network to perform at least the following step:
sending to a User Equipment (UE) beam-level measurement parameters and at least one threshold for power savings and associated Radio Resource Management (RRM) measurement and/or reporting configuration.

Thus, an advantage of the presented example embodiments is a notable power saving obtained in the UE and in the system in general, obtained through reduced measurement schemes of the UEs.

A further advantage of the example embodiments is that the introduced algorithm exploits the beam level measurements, which are running at the UE for legacy beam management purposes, but where the introduced algorithm estimates the UE mobility state and applies a relaxation scheme for the measurements appropriately based on the estimated UE mobility state. In other words, existing measurements can be used in the introduced algorithm.

It is to be noted that orders of the presented method steps are not critical in the example embodiments.

The example embodiments (i.e. presented embodiments of the algorithm) can be implemented in a system comprising a network side supplied with at least one processor applying processing circuitry, and at least one User Equipment (UE) supplied with at least one processor applying processing circuitry as well, in an example embodiment. Additionally, at least one memory unit can be used as part of the system for storing the processed data and computer program(s) applying the presented algorithm among other needed operations. The processed data may comprise the defined time window and threshold value parameters used in the example embodiments.

As used in this disclosure, the term "circuitry" may refer to one or more or all of the following:
(a) hardware-only circuit implementations (such as implementations in only analog and/or digital circuitry), and
(b) combinations of hardware circuits and software, such as (as applicable):
(i) a combination of analog and/or digital hardware circuit(s) with software/firmware, and
(ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g. firmware) for operation, but the software may not be present, when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

The presented example embodiments may be applied in a wide range of technologies, for example, involving services, software, audio, virtual and augmented reality, digital health, materials, automotive and navigation technology, user interface, cellular and non-cellular network technology, optical network technology and enabling technology for Internet to name just a few technical areas.

The present invention is not restricted merely to example embodiments disclosed above, but the present invention is defined by the scope of the claims.

The invention claimed is:

1. A User Equipment (UE) apparatus, in connection to a telecommunication network, the UE apparatus comprising
at least one processor,
at least one memory comprising computer program code,
the at least one memory and the computer program code configured to, with the at least one processor, cause the UE apparatus at least to:
receive a network configuration comprising beam-level measurement parameters and at least one threshold for power savings and associated measurement and/or reporting configuration,
monitor a number N of distinct serving beams changes within a predetermined time window T against the received at least one threshold based on the received network configuration, as the beam-level measurement, where N and T are beam-level measurement parameters,
estimate a mobility state based on at least a beam-level measurement in view of the received at least one threshold and/or the beam-level measurement parameters, and
apply the associated measurement configuration based on the estimated mobility state,
wherein the received at least one threshold comprises three or more thresholds, where there are respectively at least four associated measurement configurations determined by the thresholds, corresponding to respective at least four mobility state estimates,
wherein after estimation of a medium mobility state, the associated measurement configuration removes completely the measurements of the neighbour cells of inter-frequency layers as well as inter-RAT cells, and increases the periodicity of the intra-frequency neighboring cell measurements,
wherein after estimation of a low mobility state, the associated measurement configuration removes completely the measurements of the neighbour cells of intra- and inter-frequency layers, and increases the periodicity of the serving cell measurements.

2. The apparatus according to claim 1, wherein the received measurement configuration associated to a low mobility state comprises a relaxed measurement scope.

3. The apparatus according to claim 2, wherein the relaxed measurement scope relates to any relaxation in terms of complete skipping or reduced measurements in terms of measurement periodicity, number of measured samples, number of measured intra- and/or inter-frequency neighbor cells and/or inter-RAT (Radio Access Technology) cells, and/or number of measured beams.

4. The apparatus according to claim 1, wherein the received at least one threshold comprises a first threshold Thr1, where a low mobility state is defined when N is below the first threshold Thr1.

5. The apparatus according to claim 4, wherein an associated measurement configuration for the estimated low mobility state comprises a fully reduced scheme of measurements for the UE.

6. The apparatus according to claim 1, wherein the received at least one threshold comprises a first threshold Thr1 and a second threshold Thr2, where a medium mobility state is defined when N is between the first and second thresholds Thr1 and Thr2.

7. The apparatus according to claim 6, wherein an associated measurement configuration for the estimated medium mobility state comprises a partially reduced scheme of measurements for the UE.

8. The apparatus according to claim 1, wherein the received at least one threshold comprises a second threshold Thr2, where a high mobility state is defined when N is above the second threshold Thr2.

9. The apparatus according to claim 8, wherein an associated measurement configuration for the estimated high mobility state comprises a regular scheme of measurements for the UE.

10. The apparatus according to claim 1, wherein in case the UE crosses back and forth the same neighbour beams multiple times so that the UE remains within a given geographical area of interest, a low mobility state is configured to be estimated.

11. A User Equipment (UE) apparatus, in connection to a telecommunication network, the UE apparatus comprising
at least one processor,
at least one memory comprising computer program code,
the at least one memory and the computer program code configured to, with the at least one processor, cause the UE apparatus at least to:
receive a network configuration comprising beam-level measurement parameters and at least one threshold for power savings and associated measurement and/or reporting configuration,
monitor a number N of distinct serving beams changes within a predetermined time window T against the received at least one threshold based on the received network configuration, as the beam-level measurement, where N and T are beam-level measurement parameters,
estimate a mobility state based on at least a beam-level measurement in view of the received at least one threshold and/or the beam-level measurement parameters, and
apply the associated measurement configuration based on the estimated mobility state,
wherein after estimation of a medium mobility state, the associated measurement configuration removes completely the measurements of the neighbour cells of inter-frequency layers as well as inter-RAT cells, and increases the periodicity of the intra-frequency neighboring cell measurements.

12. A User Equipment (UE) apparatus, in connection to a telecommunication network, the UE apparatus comprising
at least one processor,
at least one memory comprising computer program code,
the at least one memory and the computer program code configured to, with the at least one processor, cause the UE apparatus at least to:
receive a network configuration comprising beam-level measurement parameters and at least one threshold for power savings and associated measurement and/or reporting configuration,
monitor a number N of distinct serving beams changes within a predetermined time window T against the received at least one threshold based on the received network configuration, as the beam-level measurement, where N and T are beam-level measurement parameters,
estimate a mobility state based on at least a beam-level measurement in view of the received at least one threshold and/or the beam-level measurement parameters, and
apply the associated measurement configuration based on the estimated mobility state,
wherein after estimation of a low mobility state, the associated measurement configuration removes completely the measurements of the neighbour cells of intra- and inter-frequency layers, and increases the periodicity of the serving cell measurements.

* * * * *